United States Patent
Seok

(10) Patent No.: US 9,807,757 B2
(45) Date of Patent: *Oct. 31, 2017

(54) METHOD AND APPARATUS OF TRANSMITTING PPDU IN WIRELESS COMMUNICATION SYSTEM

(71) Applicant: LG ELECTRONICS INC., Seoul (KR)

(72) Inventor: Yong Ho Seok, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/251,608

(22) Filed: Aug. 30, 2016

(65) Prior Publication Data

US 2016/0374062 A1 Dec. 22, 2016

Related U.S. Application Data

(63) Continuation of application No. 14/041,950, filed on Sep. 30, 2013, now Pat. No. 9,438,405, which is a
(Continued)

(30) Foreign Application Priority Data

Jun. 23, 2008 (KR) ........................ 10-2008-0058977

(51) Int. Cl.
*H04W 72/04* (2009.01)
*H04L 1/00* (2006.01)
(Continued)

(52) U.S. Cl.
CPC ......... *H04W 72/042* (2013.01); *H04L 1/0083* (2013.01); *H04L 5/0058* (2013.01);
(Continued)

(58) Field of Classification Search
None
See application file for complete search history.

(56) References Cited

U.S. PATENT DOCUMENTS

| 7,054,296 B1 * | 5/2006 | Sorrells | H04B 1/406 370/338 |
| 7,830,919 B1 * | 11/2010 | Thompson | H04L 69/16 370/469 |

(Continued)

FOREIGN PATENT DOCUMENTS

WO WO 2005/071910 A1 8/2005

OTHER PUBLICATIONS

Valentin et al., "Integrating Multiuser Dynamic OFDMA Into IEEE 802.11 WLANs—LLC/MAC Extension and System Performance", IEEE International Conference on Communications, pp. 3328-3334, May 19-23, 2008.

*Primary Examiner* — Candal Elpenord
(74) *Attorney, Agent, or Firm* — Birch, Stewart, Kolasch & Birch, LLP

(57) ABSTRACT

A method is provided for transmitting a physical layer protocol data unit (PPDU) in a wireless communication system. For a first data stream associated with a first PPDU to be transmitted via a first channel, a wireless device includes a first data block, a first header indicating a first modulation and coding scheme (MCS), and a first physical layer service data unit (PSDU) in the first data stream. For a second data stream associated with a second PPDU to be transmitted via a second channel, the wireless device includes a second data block, a second header indicating a second MCS and a second PSDU in the second data stream. The wireless device performs a padding procedure to at least one of the first data stream and the second data stream, and
(Continued)

transmits the first data stream and the second data stream by using the first PPDU and the second PPDU.

8 Claims, 8 Drawing Sheets

Related U.S. Application Data continuation of application No. 12/994,985, filed as application No. PCT/KR2009/002872 on May 29, 2009, now Pat. No. 8,619,814.

(60) Provisional application No. 61/057,640, filed on May 30, 2008.

(51) Int. Cl.
*H04W 56/00* (2009.01)
*H04W 80/02* (2009.01)
*H04L 5/00* (2006.01)
*H04W 72/02* (2009.01)
*H04W 88/06* (2009.01)
*H04W 84/12* (2009.01)

(52) U.S. Cl.
CPC ......... *H04W 56/001* (2013.01); *H04W 72/02* (2013.01); *H04W 80/02* (2013.01); *H04W 72/04* (2013.01); *H04W 72/0446* (2013.01); *H04W 84/12* (2013.01); *H04W 88/06* (2013.01)

(56) References Cited

U.S. PATENT DOCUMENTS

| | | |
|---|---|---|
| 7,983,298 B2 | 7/2011 | Nanda et al. |
| 8,054,851 B2 | 11/2011 | Kim et al. |
| 8,059,681 B2 | 11/2011 | Kim et al. |
| 8,351,519 B2 | 1/2013 | Aggarwal et al. |
| 9,001,636 B2 | 4/2015 | Stephens et al. |
| 2003/0135797 A1 | 7/2003 | Choi |
| 2004/0054820 A1 | 3/2004 | Karaoguz et al. |
| 2004/0114546 A1 | 6/2004 | Seshadri et al. |
| 2004/0196871 A1 | 10/2004 | Terry |
| 2005/0136933 A1 | 6/2005 | Sandhu et al. |
| 2005/0138194 A1 | 6/2005 | Lu et al. |
| 2006/0007898 A1 | 1/2006 | Maltsev et al. |
| 2006/0034178 A1 | 2/2006 | Yang et al. |
| 2006/0056443 A1 | 3/2006 | Tao et al. |
| 2006/0218459 A1 | 9/2006 | Hedberg |
| 2006/0280134 A1 | 12/2006 | Kwon et al. |
| 2008/0002794 A1 | 1/2008 | Wallace et al. |
| 2008/0049654 A1 | 2/2008 | Otal et al. |
| 2008/0181097 A1 | 7/2008 | Goldberg et al. |
| 2008/0232490 A1 | 9/2008 | Gross et al. |

* cited by examiner

FIG. 7

| Ch1 | Ch2 |
|---|---|
| PPDU 1 ||
| PPDU 2 ||
| PPDU 3 ||
| PPDU 4 ||

(a)

| Ch1 | Ch2 |
|---|---|
| PPDU 1 | PPDU 2 |
| PPDU 3 | PPDU 4 |

(b)

METHOD AND APPARATUS OF TRANSMITTING PPDU IN WIRELESS COMMUNICATION SYSTEM

CROSS-REFERENCE TO RELATED APPLICATIONS

This application is a continuation of co-pending U.S. patent application Ser. No. 14/041,950 filed on Sep. 30, 2013, which is a continuation of U.S. patent application Ser. No. 12/994,985 filed on Nov. 29, 2010 (now U.S. Pat. No. 8,619,814 issued on Dec. 31, 2013), which is the National Phase of PCT International Application No. PCT/KR2009/002872 filed on May 29, 2009, which claims the benefit of U.S. Provisional Application No. 61/057,640 filed on May 30, 2008, and which claims priority to Application No. 10-2008-0058977 filed in the Republic of Korea on Jun. 23, 2008. The entire contents of all of the above applications are hereby incorporated by reference.

BACKGROUND OF THE INVENTION

The present invention relates to a wireless local access network (WLAN), and more particularly, to a method and apparatus of transmitting a physical layer convergence protocol (PLCP) protocol data unit (PPDU) in a WLAN.

With the advancement of information communication technologies, various wireless communication technologies have recently been developed. Among the wireless communication technologies, a wireless local access network (WLAN) is a technology whereby super high-speed Internet access is possible in a wireless fashion in homes or businesses or in a region providing a specific service by using a portable terminal such as a personal digital assistant (PDA), a laptop computer, a portable multimedia player (PMP), etc.

Ever since the institute of electrical and electronics engineers (IEEE) 802, i.e., a standardization organization for WLAN technologies, was established in February 1980, many standardization works have been conducted. In the initial WLAN technology, a frequency of 2.4 GHz was used according to the IEEE 802.11 to support a data rate of 1 to 2 Mbps by using frequency hopping, spread spectrum, infrared ray communication, etc. Recently, the WLAN technology can support a data rate of up to 54 Mbps by using orthogonal frequency division multiplex (OFDM). In addition, the IEEE 802.11 is developing or commercializing standards of various technologies such as quality of service (QoS) improvement, access point (AP) protocol compatibility, security enhancement, radio resource measurement, wireless access in vehicular environments, fast roaming, mesh networks, inter-working with external networks, wireless network management, etc.

In the IEEE 802.11, the IEEE 802.11b supports a data rate of up to 11 Mbps by using a frequency band of 2.4 GHz. The IEEE 802.11a commercialized after the IEEE 802.11b uses a frequency band of 5 GHz instead of the frequency band of 2.4 GHz and thus significantly reduces influence of interference in comparison with the very congested frequency band of 2.4 GHz. In addition, the IEEE 802.11a has improved the data rate to up to 54 Mbps by using the OFDM technology. Disadvantageously, however, the IEEE 802.11a has a shorter communication distance than the IEEE 802.11b. Similarly to the IEEE 802.11b, the IEEE 802.11g realizes the data rate of up to 54 Mbps by using the frequency band of 2.4 GHz. Due to its backward compatibility, the IEEE 802.11g is drawing attention, and is advantageous over the IEEE 802.11a in terms of the communication distance.

The IEEE 802.11n is a technical standard relatively recently introduced to overcome a limited data rate and throughput which has been considered as a drawback in the WLAN. The IEEE 802.11n is devised to increase network speed and reliability and to extend an operational distance of a wireless network. More specifically, the IEEE 802.11n supports a high throughput (HT), i.e., a data processing speed of up to 540 Mbps at a frequency band of 5 GHz, and is based on a multiple input and multiple output (MIMO) technique which uses multiple antennas in both a transmitter and a receiver to minimize a transmission error and to optimize a data rate. In addition, this standard may use a coding scheme which transmits several duplicated copies to increase data reliability and also may use the OFDM to support a higher data rate.

With the widespread use of WLAN and the diversification of applications using the WLAN, there is a recent demand for a new WLAN system to support a higher throughput than a data processing speed supported by IEEE 802.11n. However, an IEEE 802.11n medium access control (MAC)/physical layer (PHY) protocol is not effective to provide a throughput of 1 Gbps or more. This is because the IEEE 802.11n MAC/PHY protocol is designed for an operation of a single station (STA), that is, an STA having one network interface card (NIC), and thus when a frame throughput is increased while maintaining the conventional IEEE 802.11n MAC/PHY protocol, a resultant additional overhead is also increased. Consequently, there is a limitation in increasing a throughput of a wireless communication network while maintaining the conventional IEEE 802.11n MAC/PHY protocol, that is, a single STA architecture.

Therefore, to achieve a data processing speed of 1 Gbps or more in the wireless communication system, a new system different from the conventional IEEE 802.11n MAC/PHY protocol (i.e., single STA architecture) is required. A very high throughput (VHT) system is a next version of the IEEE 802.11n WLAN system, and is one of IEEE 802.11 WLAN systems which have recently been proposed to support a data processing speed of 1 Gbps or more in a MAC service access point (SAP). The VHT system is named arbitrarily. To provide a throughput of 1 Gbps or more, a feasibility test is currently being conducted for the VHT system using 4×4 MIMO and a channel bandwidth of 80 MHz.

The IEEE 802.11a standard uses a channel bandwidth of 20 MHz at a 5 GHz band. According to this standard, up to 13 channels can be used, which may differ from one country to another. In addition, the IEEE 802.11n standard uses channel bandwidths of 20 MHz and 40 MHz at the 5 GHz band. In this situation, the newly proposed VHT system can use a channel bandwidth of 80 MHz or more at the 5 GHz band according to two methods described below.

In a first method, a channel bandwidth of 80 MHz or more is used, and a channel in use includes a plurality of non-contiguous subchannels. Subchannels are non-contiguous when a different band is allocated therebetween. The channel used in this method can be referred to as an "aggregation channel". A plurality of 20 MHz subchannels can be grouped to ensure an 80 MHz aggregation channel required in the VHT system. Advantageously, this method can be a practical solution that considers a current channel usage at the 5 GHz band which is commercialized and realized at present. However, it is not easy to manage the non-contiguous subchannels according to a single communication protocol, and channel efficiency may differ from one subchannel to another when a subchannel spacing is great. Therefore, this method is not much effective.

In a second method, a channel in use includes a plurality of contiguous subchannels. The bandwidth of the channel may be 80 MHz or more. The channel used in this method can be referred to as a "bonding channel". 20 MHz subchannels contiguous to one another are grouped into 4 subchannels to ensure a 80 MHz bonding channel required in the VHT WLAN system. Since this method concurrently manages a plurality of contiguous subchannels, there is an advantage in that channel management can be effectively achieved and a channel characteristic is not significantly different from one subchannel to another.

However, the VHT system using the bonding channel can be adopted by solving a problem of coexistence with a WLAN system using the conventional 5 GHz band, that is, the IEEE 802.11a and IEEE 802.11n WLAN system. That is, if the coexistence problem with the IEEE 802.11a and IEEE 802.11n WLAN system currently commercialized is not solved, it is difficult to adopt the VHT system using a continuous channel bandwidth of 80 MHz or more at the 5 GHz band. Consequently, the VHT system using the continuous channel bandwidth of 80 MHz or more inevitably has to coexist with the conventional IEEE 802.11a and IEEE 802.11n WLAN system. Therefore, there is a need to solve the coexistence problem with the conventional WLAN system.

SUMMARY OF THE INVENTION

The present invention provides a method and apparatus of transmitting a physical layer convergence protocol (PLCP) protocol data unit (PPDU) for coexistence with a legacy station (STA).

The present invention also provides a method and apparatus of transmitting a PPDU supporting high throughput.

The present invention also provides a method and apparatus of transmitting a PPDU supporting a plurality of subchannels.

In an aspect, a method of transmitting a PPDU in a wireless communication system is provided. The method includes selecting a subchannel among a plurality of subchannels, wherein a PLCP preamble and a PLCP header in each PPDU are independently generated in each of the plurality of subchannels, and transmitting a PPDU in the selected subchannel.

The PLCP header in the PPDU may comprise information on a modulation and coding scheme (MCS) of the selected subchannel. The MCS of the selected subchannel may correspond to a MCS of a PLCP service data unit (PSDU) in the PPDU.

A bandwidth of each of the plurality of subchannels may be 20 MHz. The number of the plurality of subchannels may be four.

In another aspect, an apparatus for wireless communication includes a radio interface supporting a plurality of subchannels, and a processor coupled with the radio interface and configured to select a subchannel among the plurality of subchannels, wherein a PLCP preamble and a PLCP header in each PPDU are independently generated in each of the plurality of subchannels, and transmitting a PPDU in the selected subchannel.

In still another aspect, a method of transmitting a PPDU in a wireless communication system is provided. The method includes generating a plurality of PPDUs in a plurality of subchannels, each of the plurality of PPDUs comprising a PLCP preamble, a PLCP header and a PSDU, wherein a PLCP preamble and a PLCP header in each of the plurality of PPDUs are independently generated in each of the plurality of subchannels, and transmitting each of the plurality of PPDUs in each of the plurality of subchannels.

In a very high throughput (VHT) system consisting of a plurality of subchannels and having a channel bandwidth of 80 MHz or more, a modulation and coding scheme (MCS) or an error correction scheme is used differently in each subframe, and a physical layer convergence protocol (PLCP) protocol data unit (PPDU) is transmitted through each subchannel. Therefore, data can be effectively transmitted even if a legacy station (STA) coexists. According to an exemplary embodiment of the present invention, the MCS and the error correction scheme can be used differently in each channel when a channel characteristic is significantly different from one subchannel to another. Therefore, channels can be effectively used.

BRIEF DESCRIPTION OF THE DRAWINGS

FIG. 7 is a diagram showing a channel allocation mechanism of PPDUs, which is a detailed diagram of FIG. 4.

DETAILED DESCRIPTION OF THE INVENTION

Figure 1:
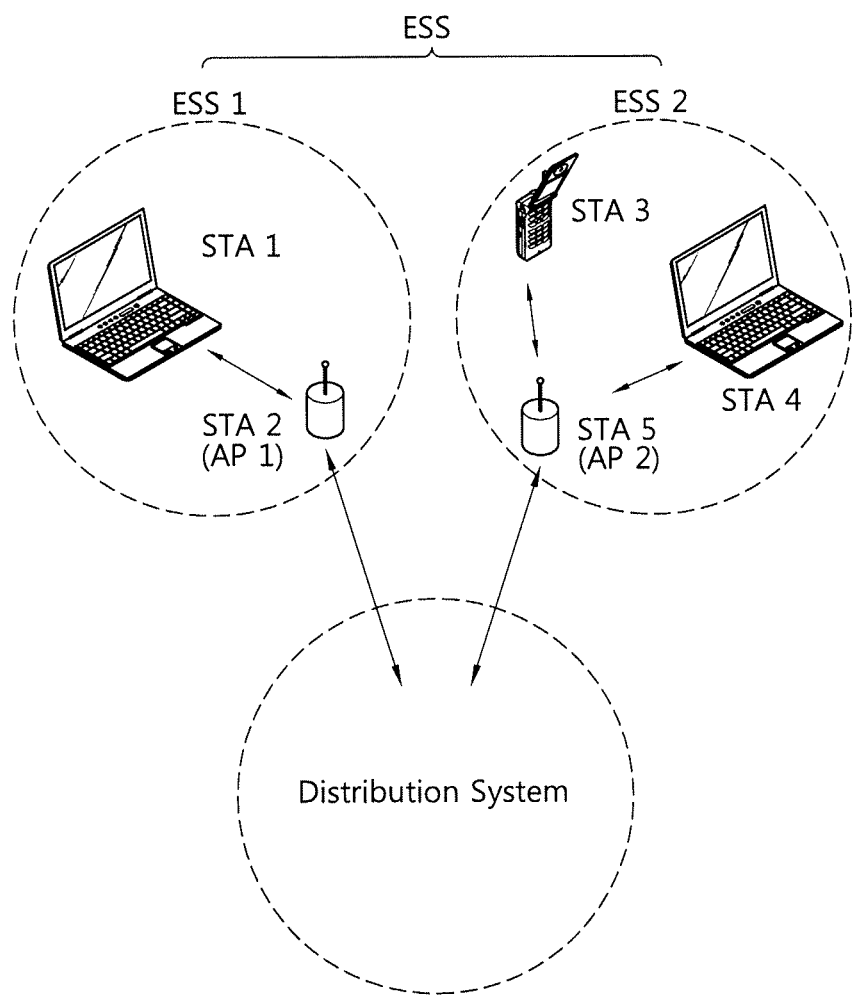
FIG. 1 is a schematic view showing an exemplary structure of a wireless local access network (WLAN) system according to an embodiment of the present invention.

FIG. 1 is a schematic view showing an exemplary structure of a wireless local access network (WLAN) system according to an embodiment of the present invention.

Referring to FIG. 1, the WLAN system includes one or more basis service sets (BSSs). The BSS is a set of stations (STAs) which are successfully synchronized to communicate with one another, and is not a concept indicating a specific region. A very high throughput (VHT) BSS is defined as a BSS that supports a super high-speed data processing speed of 1 GHz or more.

A VHT system including one or more VHT BSSs can use a channel bandwidth of 80 MHz, which is for exemplary purposes only. For example, the VHT system may use a channel bandwidth of 60 MHz or 100 MHz or more. As such, the VHT system operates in a multi-channel environment where a plurality of subchannels having a specific size, e.g., a channel bandwidth of 20 MHz, are included.

The BSS can be classified into an infrastructure BSS and an independent BSS (IBSS). The infrastructure BSS is shown in FIG. 1. Infrastructure BSSs (i.e., BSS1 and BSS2) include one or more STAs (i.e., STA1, STA3, and STA4), access points (APs) which are STAs providing a distribution service, and a distribution system (DS) connecting a plurality of APs (i.e., AP1 and AP2). On the other hand, the IBSS does not include APs, and thus all STAs are mobile STAs. In addition, the IBSS constitutes a self-contained network since connection to the DS is not allowed.

The STA is an arbitrary functional medium including a medium access control (MAC) and wireless-medium physical layer (PHY) interface conforming to the institute of electrical and electronics engineers (IEEE) 802.11 standard, and includes both an AP and a non-AP STA in a broad sense. A VHT STA is defined as an STA that supports the super high-speed data processing speed of 1 GHz or more in the multi-channel environment to be described below.

The STA for wireless communication includes a processor and a transceiver, and also includes a user interface, a display element, etc. The processor is a functional unit devised to generate a frame to be transmitted through a wireless network or to process a frame received through the wireless network, and performs various functions to control STAs. The transceiver is functionally connected to the processor and is a functional unit devised to transmit and receive a frame for the STAs through the wireless network.

Among the STAs, non-AP STAs (i.e., STA1, STA3, STA4, STA6, STAT7, and STAB) are portable terminals operated by users. A non-AP STA may be simply referred to as an STA. The non-AP STA may also be referred to as a wireless transmit/receive unit (WTRU), a user equipment (UE), a mobile station (MS), a mobile terminal, a mobile subscriber unit, etc. A non-AP VHT-STA is defined as a non-AP STA that supports the super high-speed data processing speed of 1 GHz or more in the multi-channel environment to be described below.

The AP (i.e., AP1 and AP2) is a functional entity for providing connection to the DS through a wireless medium for an associated STA. Although communication between non-AP STAs in an infrastructure BSS including the AP is performed via the AP in principle, the non-AP STAs can perform direct communication when a direct link is set up. In addition to the terminology of an access point, the AP may also be referred to as a centralized controller, a base station (BS), a node-B, a base transceiver system (BTS), a site controller, etc. A VHT AP is defined as an AP that supports the super high-speed data processing speed of 1 GHz or more in the multi-channel environment to be described below.

A plurality of infrastructure BSSs can be interconnected by the use of the DS. An extended service set (ESS) is a plurality of BSSs connected by the use of the DS. STAs included in the ESS can communicate with one another. In the same ESS, a non-AP STA can move from one BSS to another BSS while performing seamless communication.

The DS is a mechanism whereby one AP communicates with another AP. By using the DS, an AP may transmit a frame for STAs associated with a BSS managed by the AP, or transmit a frame when any one of the STAs moves to another BSS, or transmit a frame to an external network such as a wired network. The DS is not necessarily a network, and has no limitation in its format as long as a specific distribution service specified in the IEEE 802.11 can be provided. For example, the DS may be a wireless network such as a mesh network, or may be a physical structure for interconnecting APs.

Figure 2:
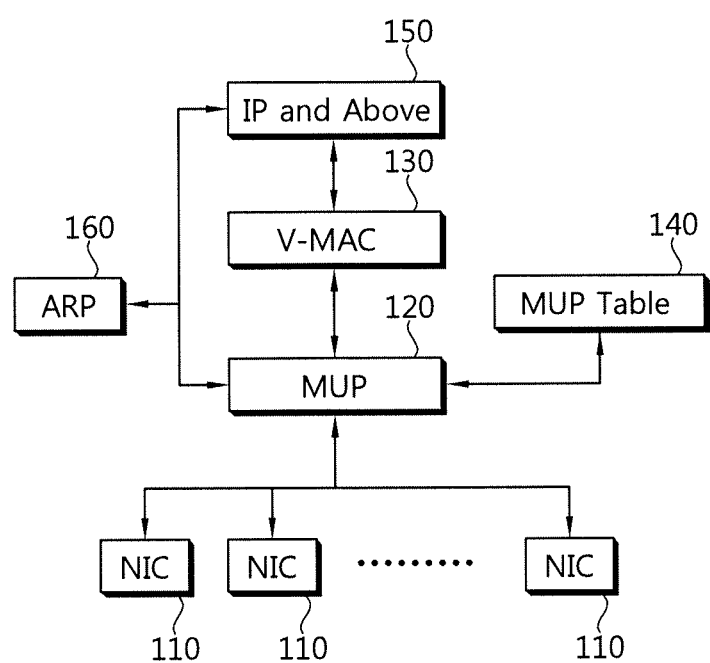
FIG. 2 is a block diagram showing a multi-radio unification protocol (MUP) as an example of a protocol applicable to a very high throughput (VHT) system including a plurality of network interface cards (NICs) each having an independent radio interface.

FIG. 2 is a block diagram showing a multi-radio unification protocol (MUP) as an example of a protocol applicable to a VHT system including a plurality of network interface cards (NICs) each having an independent radio interface.

Referring to FIG. 2, an STA supporting the MUP includes a plurality of NICs 110. The NICs 110 are separately depicted in FIG. 2, which implies that each NIC 110 may independently operate a MAC/PHY module. That is, the NICs 110 are distinctively depicted in FIG. 2 to show that the NICs 110 are logical entities operating according to individual MAC/PHY protocols. Therefore, the plurality of NICs 110 can be implemented with physically distinctive functional entities, or can be implemented by integrating the physical entities into one physical entity.

The plurality of NICs 110 can be classified into a primary radio interface and one or more secondary radio interfaces. If a plurality of secondary radio interfaces are present, the secondary radio interfaces can be classified into a first secondary radio interface, a second secondary radio interface, a third secondary radio interface, etc. The classification into the primary interface and the secondary interface and/or the classification of the secondary ratio interface itself may be determined by a policy or may be adoptively determined in consideration of a channel environment.

The plurality of NICs 110 are integrally managed by the MUP 120. As a result, the plurality of NICs 110 are externally recognized as if they are one device. The VHT system includes a virtual-MAC (V-MAC) 130. Through the V-MAC 130, an upper layer 150 may ne recognize that a multi-radio channel is operated by the plurality of NICs 110. As such, in the VHT system, the upper layer 150 does not recognize the multi-radio channel through the V-MAC 130. This means that one virtual Ethernet address is provided. A address resolution protocol (ARP) 160 is used to find a host's link layer address when only its Internet Layer (IP) or some other Network Layer address is known.

A physical layer convergence protocol (PLCP) sublayer interfaces the physical layer (PHY) service to the IEEE 802.11 medium access control (MAC) service. A PLCP frame includes a PLCP preamble, a PLCP header, and a MAC management protocol data unit MPDU. The function of the PLCP sublayer is to provide a mechanism for transferring MPDUs between two or more STAs.

A PLCP protocol data unit (PPDU) is a data unit in the PHY. The PPDU frame format provides for the asynchronous transfer of MAC sublayer MPDUs from any transmitting STA to all receiving STAs within the wireless LAN's BSS. The PPDU includes a PLCP preamble, a PLCP header, and a PLCP service data unit (PSDU). The PLCP preamble provides a period of time for several receiver functions. These functions may include antenna diversity, clock and data recovery, and field delineation of the PLCP header and the PSDU. The PLCP preamble may include information on synchronization to be provided so that the receiver can perform the necessary operations for synchronization. The PLCP header may be used to specify the length of the whitened PSDU field and support any PLCP management information.

Next, a channel allocation mechanism of PPDUs in a VHT system will be described. Although the embodiments described below relate to a VHT system using a bonding channel in which contiguous 4 subchannels having a bandwidth of 20 MHz are combined (i.e., a bonding channel having a channel bandwidth of 80 MHz), this is for exemplary purposes only. The embodiments described below can equally apply to a VHT system including a plurality of contiguous/non-contiguous subchannels (e.g., 3 or 5 or more subchannels), which is apparent to those skilled in the art. In addition, the embodiments of the present invention are not limited to the VHT system whose subchannel has a bandwidth of 20 MHz.

When a VHT system uses a bonding channel (having the channel bandwidth of 80 MHz) consisting of contiguous 4 subchannels (having a channel bandwidth of 20 MHz), a channel characteristic differs from one subchannel to another. That is, not only a channel characteristic differs at a specific time but also a channel variation differs over time. For example, a 1st subchannel with lowest frequency experiences no interference, but a 4th subchannel with highest frequency may experience deterioration in its channel characteristic due to several factors. In addition, since a legacy STA exists only in a specific subchannel, the subchannel needs to solve an interference problem caused by the legacy STA.

Figure 3:
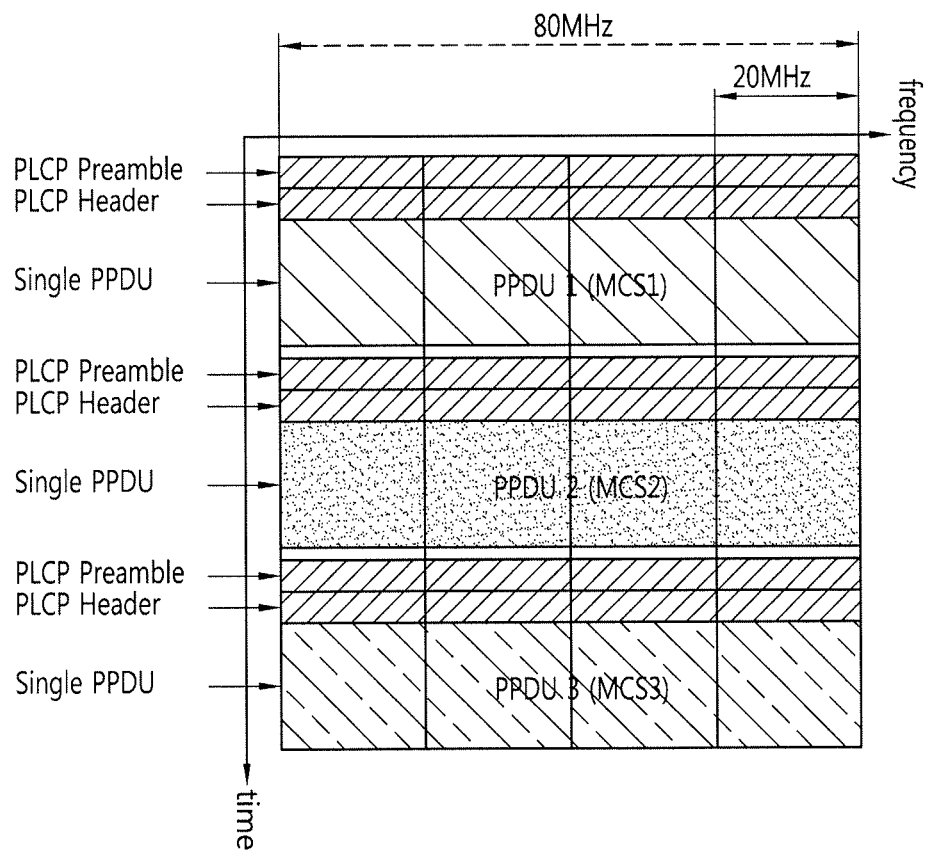
FIG. 3 is a diagram showing a channel allocation mechanism of physical layer convergence protocol (PLCP) protocol data units (PPDUs) in which the entirety of a bonding channel is regarded as one channel.

FIG. 3 is a diagram showing a channel allocation mechanism of PPDUs in which the entirety of a bonding channel is regarded as one channel.

Referring to FIG. 3, one PPDU is allocated through the entirety of the bonding channel consisting of 4 subchannels and is then transmitted to a counterpart VHT STA. In this case, a PLCP preamble and a PLCP header for PPDU transmission may also be transmitted by being allocated through the entirety of the bonding channel, instead of configuring them independently for each subchannel. This mechanism is identical to a channel allocation mechanism of PPDUs in a WLAN system consisting of a single channel, and thus can be easily used.

On the other hand, the mechanism of FIG. 3 does not consider a channel characteristic of each subchannel constituting the bonding channel, and thus there is a problem in that transmission efficiency is decreased even if a characteristic of any one of subchannels is poor. That is, since an error rate for a PPDU is determined by a subchannel having a worst channel characteristic, high transmission efficiency cannot be obtained even if a channel characteristic of another subchannel is excellent. In this case, a modulation and coding scheme (MCS) and/or an error correction scheme for the PPDU is also determined by the subchannel having the worst channel characteristic. Therefore, according to the channel allocation mechanism of PPDUs of FIG. 3, there is a limitation in that subchannels having relatively good channel characteristics cannot be effectively used, and as a result, transmission efficiency of the entirety of the bonding channel deteriorates.

To overcome the limitation, an embodiment of the present invention proposes a channel allocation mechanism of PPDUs by considering an intrinsic characteristic of a VHT system in which respective channel characteristics of subchannels constituting a bonding channel are different and flexible.

According to the embodiment of the present invention, a PLCP preamble and/or a PLCP header may be generated independently in each subchannel. By doing so, an MCS and/or an error correction scheme (e.g., a forward error correction (FEC) such as low density parity check (LDCP) or Reed Solomon code) for subsequent PPDU transmission can be used differently in each subchannel.

Figure 4:
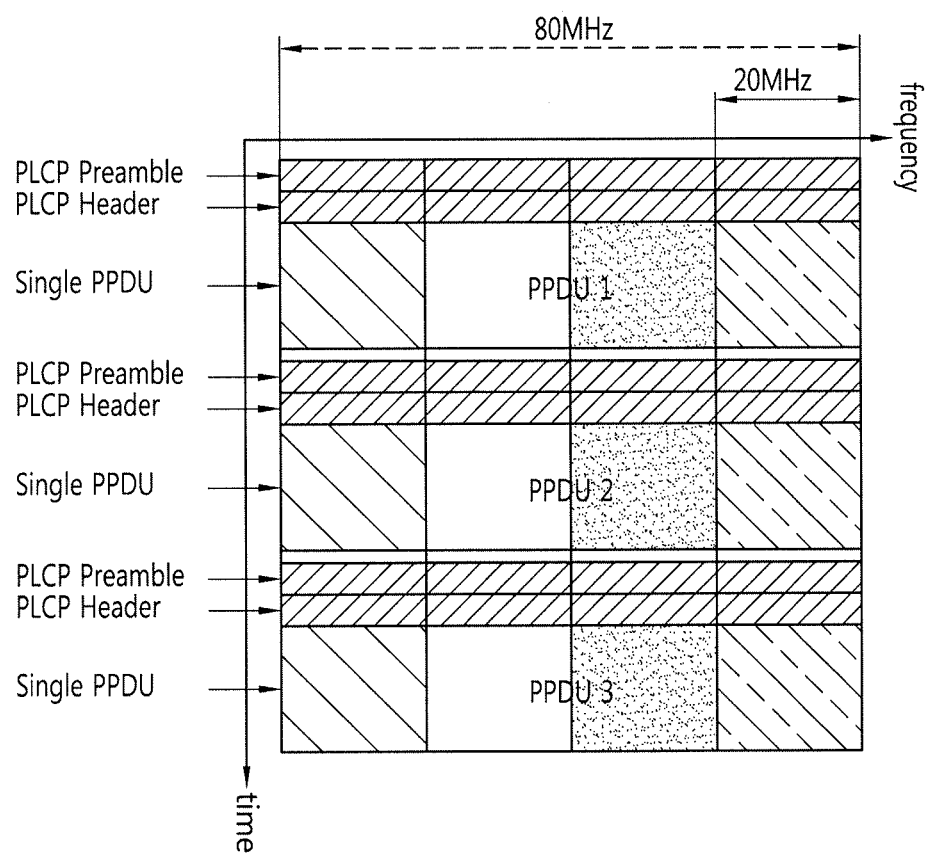
FIG. 4 is a diagram showing a channel allocation mechanism of PPDUs according to a first embodiment of the present invention.

FIG. 4 is a diagram showing a channel allocation mechanism of PPDUs in a VHT WLAN system according to an embodiment of the present invention.

Referring to FIG. 4, 'single PPDU' denotes a time interval to transmit one PPDU. A first PPDU (PPDU1), a second PPDU (PPDU2) and a third PPDU (PPDU3) are subsequently transmitted. Each PPDU is transmitted over 4 subchannels and may have different MCS in each subchannel. This means that each PPDU may have multiple portions which are independently generated in each subchannel. Each portion may include a PLCP preamble and/or a PLCP header. The PLCP header may include the MCS which corresponds to a MCS of a PSDU in the each portion.

Figure 5:
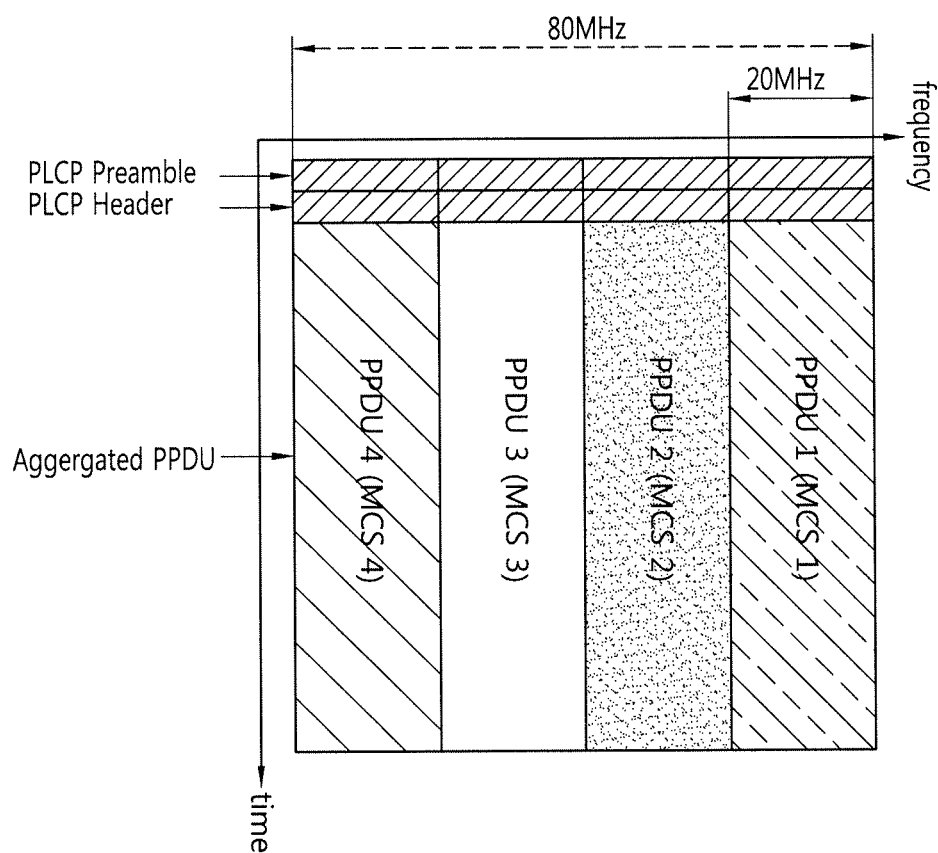
FIG. 5 is a diagram showing a channel allocation mechanism of PPDUs according to a second embodiment of the present invention.

FIG. 5 is a diagram showing a channel allocation mechanism of PPDUs in a VHT WLAN system according to another embodiment of the present invention. The embodiment of FIG. 5 relates to a method of PPDU aggregation for point-to-point connection.

Referring to FIG. 5, a first PPDU (PPDU1), a second PPDU (PPDU2), a third PPDU (PPDU3) and a fourth PPDU (PPDU4) are simultaneously transmitted but are transmitted in different subchannels. One PPDU occupies one subchannel. Therefore, each PPDU is independently generated in each subchannel and may have different MCS. If N is the number of subchannels, up to N PPDUs can be simultaneously transmitted.

A STA may use a plurality of subchannels or one of the plurality of subchannels. Before transmit a PPDU, a STA may receive information on the selected subchannel from an AP. The AP may indicate each subchannel to be used by each STA.

According to this embodiment, an MCS and/or an error connection scheme can be used differently for each PPDU. That is, since transmission is performed using independent subchannels for each PPDU, any MCS and/or error correction scheme can be used for each PPDU. For example, an MCS and an error correction scheme having a relatively smaller amount of additional data derived from the MCS and/or the error correction scheme can be used for a subchannel whose channel characteristic is excellent at a specific time. An MCS and/or an error correction scheme capable of ensuring successful PPDU transmission even if a channel condition is poor may be used for a subchannel whose channel characteristic is poor. If a legacy STA operates in a specific subchannel and the legacy STA occupies the subchannel, a PPDU may be not transmitted through the subchannel.

In order to allocate the PPDU for each subchannel in this manner, relevant information is preferably reported in advance to a counterpart VHT STA by using a previously transmitted PLCP preamble and/or PLCP header. That is, by using the PLCP preamble and/or PLCP header, information regarding signal detection, automatic gain control (AGC), diversity selection, channel and fine frequency offset estimation and/or an MCS and error correction scheme is reported to a recipient VHT STA.

In addition, for the effective use of a method of transmitting a PPDU independently for each subchannel according to the embodiment of the present invention, that is, a method of PPDU aggregation for point-to-point connection, a transmission time of PPDUs transmitted at the same time is maintained to be as identical as possible. As such, to maintain the transmission time of PPDUs transmitted through different channels, it is preferable to adaptively regulate a size of a PPDU transmitted through one subchannel by property fragmenting the PPDU or by using a zero padding or the like.

Figure 6:
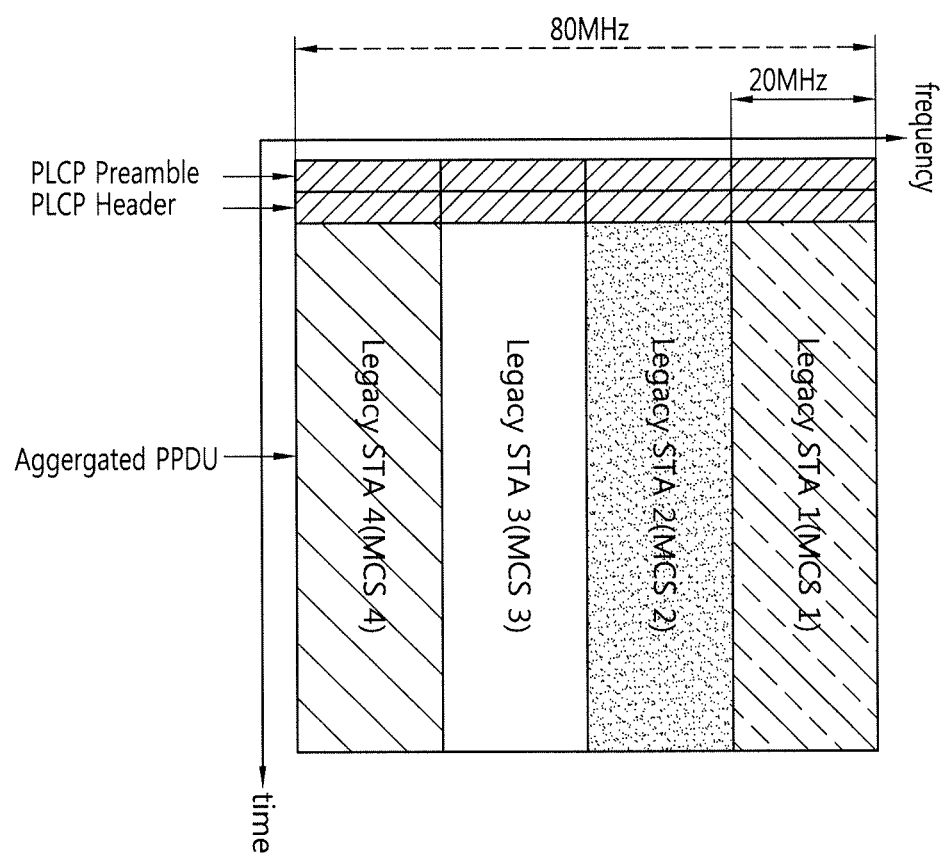
FIG. 6 is a diagram showing a channel allocation mechanism of PPDUs according to a third embodiment of the present invention.

FIG. 6 is a diagram showing a channel allocation mechanism of PPDUs in a VHT WLAN system according to another embodiment of the present invention. The embodiment of FIG. 6 relates to a method of PPDU aggregation for point-to-multipoint connection.

If a legacy STA accesses to a VHT AP, the use of a channel allocation procedure of PPDUs as shown in FIG. 4 may result in deterioration of overall performance of a VHT BSS managed by the VHT AP and deterioration of a data transmission throughput. This is because, in a VHT WLAN system using a bonding channel including a plurality of subchannels, if the legacy STA uses only any one of subchannels, for example, if a legacy IEEE 802.11 STA uses only a channel bandwidth of 20 MHz in a VHT BSS using a channel bandwidth of 80 MHz, the use of the channel allocation mechanism of PPDUs as shown in FIG. 4 results in discarding other subchannels (i.e., a 60 MHz channel).

According to one method of solving these problems, in a VHT WLAN system according to the embodiment of the present invention, different subchannels are used when a legacy IEEE 802.11 STA accesses to a VHT AT. In this case, if one or more legacy STAs are connected to the VHT AP, irrespective of whether it is a VHT STA or a legacy STA, another STA can be configured to use one or more subchannels different from those of the previously connected legacy STA.

For example, as shown in FIG. 6, separate 4 legacy STAs (i.e., a legacy STA 1, a legacy STA 2, a legacy STA 3, and a legacy STA 4) can access to a VHT-AP by using corresponding separate subchannels (e.g., a subchannel 1, a subchannel 2, a subchannel 3, and a subchannel 4 respectively for the legacy STAs 1, 2, 3, and 4). For this, the VHT-AP is preferably allowed to independently transmit a probe response frame and/or a beacon frame or the like with respect to all subchannels.

Assume that a VHT AP transmits frames to legacy STAs. In this case, the VHT AP constitutes a bonding channel and transmits the frames to each legacy STA by using subchannels connecting the legacy STAs. If the VHT STA uses a channel bandwidth of 80 MHz, the frames can be transmitted to up to the 4 legacy STAs by fully using the 80 MHz channel. In this case, a PPDU for each legacy STA is transmitted by using independent subchannels. If N is the number of subchannels, up to N legacy STAs can perform transmission simultaneously.

According to the embodiment of the present invention, any MCS and/or error correction scheme is used in each legacy STA using an independent subchannel. That is, according to the embodiment of the present invention, legacy STAs using different subchannels may use different MCS and/or error correction schemes. In order to allocate the PPDU for each subchannel in this manner, relevant information is preferably reported in advance to a counterpart VHT STA by using a previously transmitted PLCP preamble and/or PLCP header. That is, by using the PLCP preamble and/or PLCP header, information regarding signal detection, automatic gain control (AGC), diversity selection, channel and fine frequency offset estimation, and/or MCS and error correction scheme is reported to a recipient VHT STA.

FIG. 7 is a diagram showing a channel allocation mechanism of PPDUs according to the embodiment of the present invention described above with reference to FIG. 4. Referring to subfigure (a) of FIG. 7, one PPDU (e.g., PPDU1, PPDU2, PPDU3, and PPDU4) is transmitted through the entirety of a bonding channel. However, according to the embodiment of the present invention, an MCS or an error correction scheme or the like can be used differently in each subchannel by considering a channel characteristic of each subchannel. Referring to subfigure (b) of FIG. 7, one PPDU is allocated for each subchannel and is then sequentially transmitted. That is, one PPDU is not transmitted through a plurality of subchannels.

Figure 8:
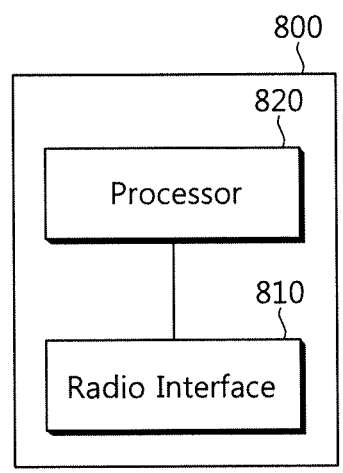
FIG. 8 is a block diagram of an apparatus for wireless communication.

FIG. 8 is a block diagram of an apparatus for wireless communication. An apparatus 800 includes a radio interface 810 and a processor 820. The apparatus 800 may be a part of a STA or an AP. The radio interface 810 may support a plurality of subchannels. The radio interface 810 may transmit a radio signal over at least one of the plurality of subchannels. The processor 820 is coupled with the radio interface 810 and transmits at least one PPDU via the radio interface 810. The method, procedure, mechanism and functions described in this disclosure may be implemented by the processor 820. The processor 820 may independently generate PPDUs in subchannels.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Although the present invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method of transmitting a physical layer protocol data unit (PPDU) in a wireless communication system, the method performed by a wireless device and comprising:
    for a first data stream associated with a first PPDU to be transmitted via a first channel, including a first data block, a first header and a first physical layer service data unit (PSDU) in the first data stream, wherein the first header indicates a modulation and coding scheme (MCS) of the first PSDU;
    for a second data stream associated with a second PPDU to be transmitted via a second channel, including a second data block, a second header and a second PSDU in the second data stream, wherein the second header indicates an MCS of the second PSDU;
    performing a padding procedure to at least one of the first data stream and the second data stream so that a time duration during which the first data stream is transmitted and a time duration during which the second data stream is transmitted have an equal time duration; and
    transmitting the first data stream and the second data stream by using the first PPDU and the second PPDU.

2. The method of claim 1, wherein the first data block and the second data block include information on synchronization.

3. The method of claim 1, wherein the first channel and the second channel are determined based on control signaling received from an access point (AP).

4. The method of claim 1, wherein the first PPDU is used for a first receiver and the second PPDU is used for a second receiver.

5. A wireless device for transmitting a physical layer protocol data unit (PPDU) in a wireless communication system, the wireless device comprising:
    a processor configured to:
        for a first data stream associated with a first PPDU to be transmitted via a first channel, include a first data block, a first header and a first physical layer service data unit (PSDU) in the first data stream, wherein the first header indicates a modulation and coding scheme (MCS) of the first PSDU, for a second data stream associated with a second PPDU to be transmitted via a second channel, include a second data block, a second header and a second PSDU in the second data stream, wherein the second header indicates an MCS of the second PSDU, and perform a padding procedure to at least one of the first data stream and the second data stream so that a time duration during which the first data stream is transmitted and a time duration during which the second data stream is transmitted have an equal time duration; and a transmitter configured to transmit the first data stream and the second data stream by using the first PPDU and the second PPDU.

6. The wireless device of claim 5, wherein the first data block and the second data block include information on synchronization.

7. The wireless device of claim 5, wherein the first channel and the second channel are determined based on control signaling received from an access point (AP).

8. The wireless device of claim 5, wherein the first PPDU is used for a first receiver and the second PPDU is used for a second receiver.

* * * * *